(12) United States Patent
Usami et al.

(10) Patent No.: US 11,618,039 B2
(45) Date of Patent: Apr. 4, 2023

(54) SEPARATION DEVICE AND SEPARATION METHOD

(71) Applicant: FUJIFILM Corporation, Tokyo (JP)

(72) Inventors: Yoshihisa Usami, Kanagawa (JP); Yasuyuki Ishii, Kanagawa (JP); Yuki Inoue, Kanagawa (JP); Aya Ouchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 122 days.

(21) Appl. No.: 17/034,040

(22) Filed: Sep. 28, 2020

(65) Prior Publication Data

US 2021/0008569 A1 Jan. 14, 2021

Related U.S. Application Data

(63) Continuation of application No. PCT/JP2018/040586, filed on Oct. 31, 2018.

(30) Foreign Application Priority Data

Mar. 30, 2018 (JP) .............................. JP2018-066535

(51) Int. Cl.
*B03C 1/08* (2006.01)
*B01D 29/44* (2006.01)
*B03C 1/033* (2006.01)
*B03C 1/28* (2006.01)
(Continued)

(52) U.S. Cl.
CPC .............. *B03C 1/08* (2013.01); *B01D 29/445* (2013.01); *B03C 1/0335* (2013.01); *B03C 1/288* (2013.01); *B03C 1/30* (2013.01); *B01D 35/06* (2013.01); *B03C 2201/18* (2013.01)

(58) Field of Classification Search
None
See application file for complete search history.

(56) References Cited

U.S. PATENT DOCUMENTS

| | | |
|---|---|---|
| 2003/0106849 A1 | 6/2003 | Hirabayashi |
| 2005/0271550 A1 | 12/2005 | Talmer et al. |
| 2010/0163493 A1 | 7/2010 | Hein et al. |

FOREIGN PATENT DOCUMENTS

| | | |
|---|---|---|
| JP | 57-81848 A | 5/1982 |
| JP | 2000-300911 A | 10/2000 |
| JP | 2001-314777 A | 11/2001 |

(Continued)

OTHER PUBLICATIONS

English language machine translation of JP 2003103465A. (Year: 2022).*

(Continued)

*Primary Examiner* — Peter Keyworth
(74) *Attorney, Agent, or Firm* — Birch, Stewart, Kolasch & Birch, LLP

(57) ABSTRACT

A separation device includes: a container that includes a storage portion for storing liquid containing magnetic particles; and a coil that separates the magnetic particles from the liquid by generating a magnetic field through application of current, causing a magnetic force to act on the magnetic particles in a state where the coil stops with respect to the storage portion, and causing the magnetic particles to move from the storage portion against gravity acting on the liquid containing the magnetic particles.

11 Claims, 8 Drawing Sheets

(51) Int. Cl.
   *B03C 1/30*   (2006.01)
   *B01D 35/06*   (2006.01)

(56) References Cited

FOREIGN PATENT DOCUMENTS

| | | |
|---|---|---|
| JP | 2003-103465 A | 4/2003 |
| JP | 2006-281435 A | 10/2006 |
| JP | 2010-115647 A | 5/2010 |
| JP | 2014-61575 A | 4/2014 |
| JP | 2014-89210 A | 5/2014 |

OTHER PUBLICATIONS

English language machine translation of JP 2006281435A. (Year: 2022).*
English language machine translation of JP 2014061575A. (Year: 2022).*
Japanese Notice of Reasons for Refusal for corresponding Japanese Application No. 2020-509596, dated Aug. 31, 2021, with an English translation.
International Preliminary Report on Patentability and Written Opinion of the International Searching Authority (Forms PCT/IB/326, PCT/IB/373 and PCT/ISA/237) for International Application No. PCT/JP2018/040586, dated Oct. 15, 2020, with English translation of the Written Opinion.
International Search Report (Form PCT/ISA/210) for International Application No. PCT/JP2018/040586, dated Jan. 29, 2019, with English translation.

* cited by examiner

SEPARATION DEVICE AND SEPARATION METHOD

CROSS-REFERENCE TO RELATED APPLICATIONS

This application is a continuation application of International Application No. PCT/JP2018/040586 filed Oct. 31, 2018, the disclosure of which is incorporated herein by reference in its entirety. Further, this application claims priority from Japanese Patent Application No. 2018-066535, filed Mar. 30, 2018, the disclosure of which is incorporated herein by reference in its entirety.

BACKGROUND

Technical Field

A technique of the present disclosure relates to a separation device and a separation method.

Related Art

JP2010-115647A discloses configuration where magnetic particles are separated from liquid by a centrifugal force and a magnetic force.

JP2014-089210A discloses configuration where a storage portion for storing liquid containing magnetic particles is moved relative to a magnet to separate the magnetic particles from the liquid by gravity and a magnetic force.

Since a rotating part for generating a centrifugal force is required in the configuration where magnetic particles are separated from liquid by a centrifugal force and a magnetic force as disclosed in JP2010-115647A, a structure is complicated.

Since a moving mechanism or a drive unit is required in the configuration where a storage portion is moved relative to a magnet as disclosed in JP2014-089210A, a structure is complicated.

SUMMARY

A technique of the disclosure has been made in consideration of the above-mentioned circumstances, and an object of the technique of the disclosure is to provide a separation device and a separation method that can separate magnetic particles from liquid with a simple structure.

A separation device according to a first aspect comprises: a container that includes a storage portion for storing liquid containing magnetic particles; and a coil that separates the magnetic particles from the liquid by generating a magnetic field through application of current, causing a magnetic force to act on the magnetic particles in a state where the coil stops with respect to the storage portion, and causing the magnetic particles to move from the storage portion against gravity acting on the liquid containing the magnetic particles.

A separation method according to a second aspect separates magnetic particles from liquid by causing a magnetic force, which is generated through application of current by a coil, to act on the magnetic particles in a state where the coil stops with respect to a storage portion for storing the liquid containing the magnetic particles and causing the magnetic particles to move from the storage portion against gravity acting on the liquid containing the magnetic particles.

DETAILED DESCRIPTION

An example of an embodiment of the invention will be described below with reference to the drawings. A front side, a rear side, an upper side, a lower side, a left side, and a right side used in the following description correspond to the directions of arrows denoted in the respective drawings by "FR", "RR", "UP", "DO", "LH", and "RH", respectively. Since these directions are directions determined for the convenience of description, the configuration of a device is not limited to these directions.

Separation Device 10

Figure 1:
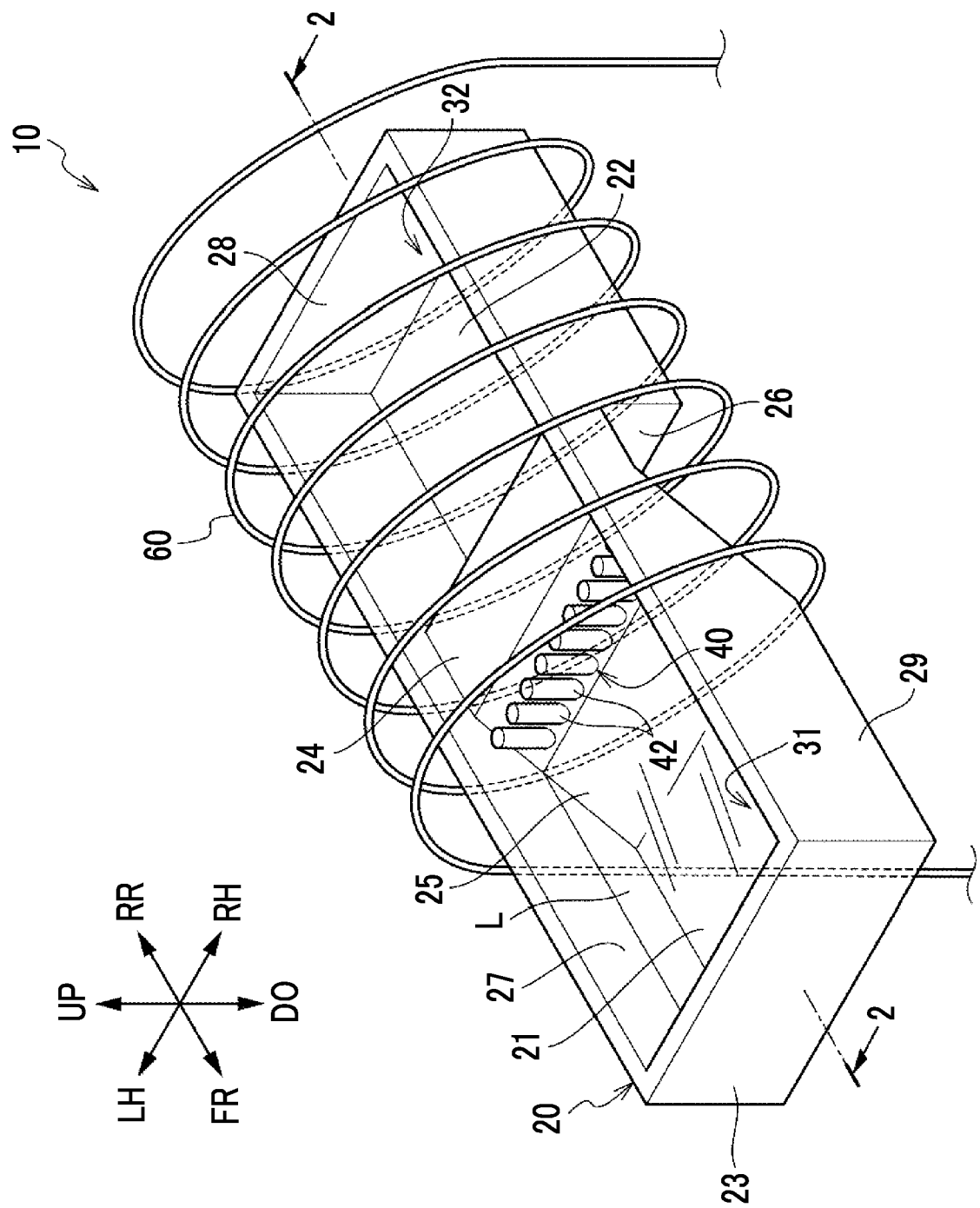
FIG. 1 is a perspective view showing the schematic configuration of a separation device according to an embodiment.
Figure 2:
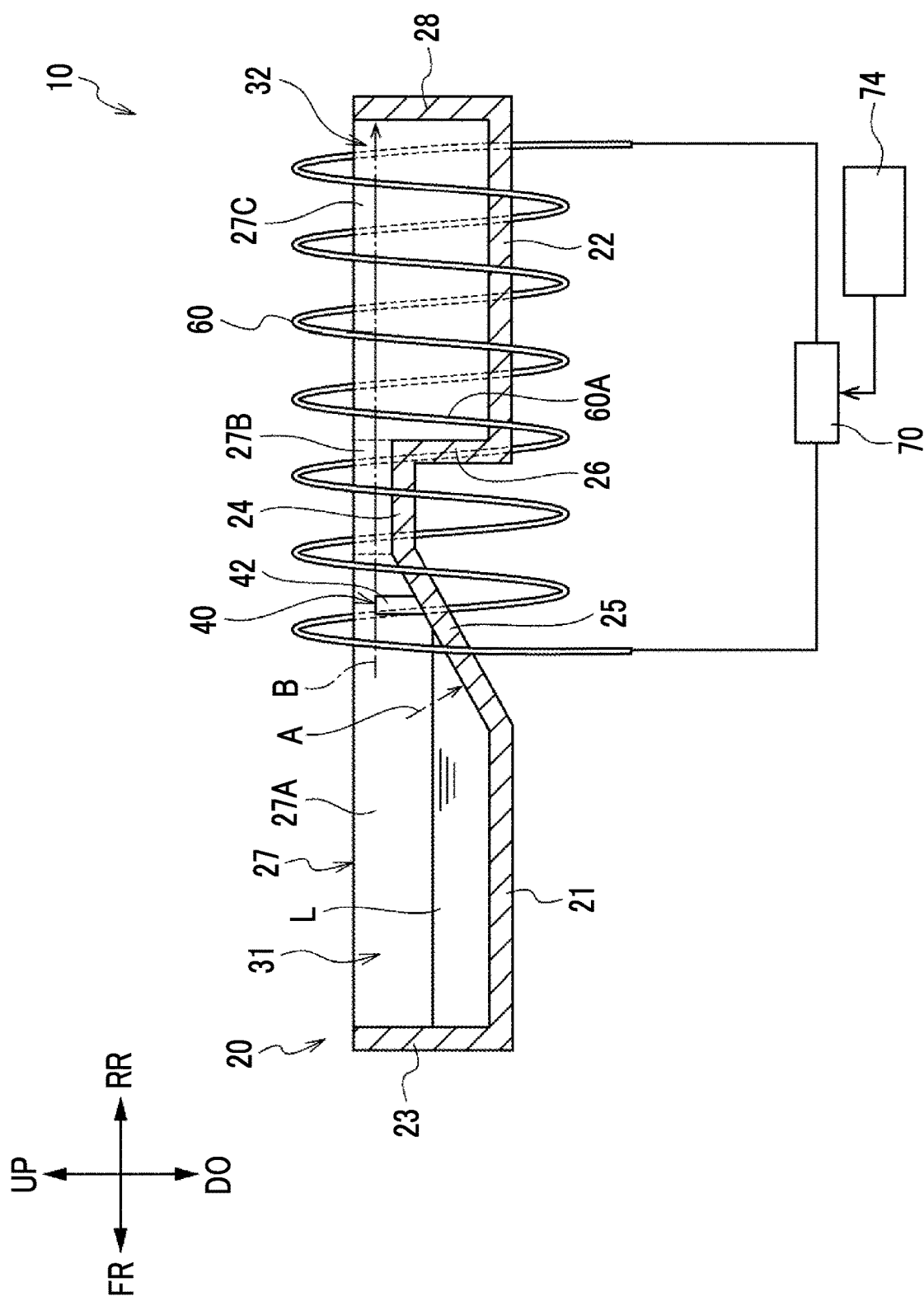
FIG. 2 is a cross-sectional view (a cross-sectional view taken along line 2-2 of FIG. 1) showing the schematic configuration of the separation device according to this embodiment.

A separation device 10 according to this embodiment will be described. FIG. 1 is a perspective view showing the schematic configuration of the separation device 10. FIG. 2 is a cross-sectional view (a cross-sectional view taken along line 2-2 of FIG. 1) showing the schematic configuration of the separation device 10.

Figure 5:
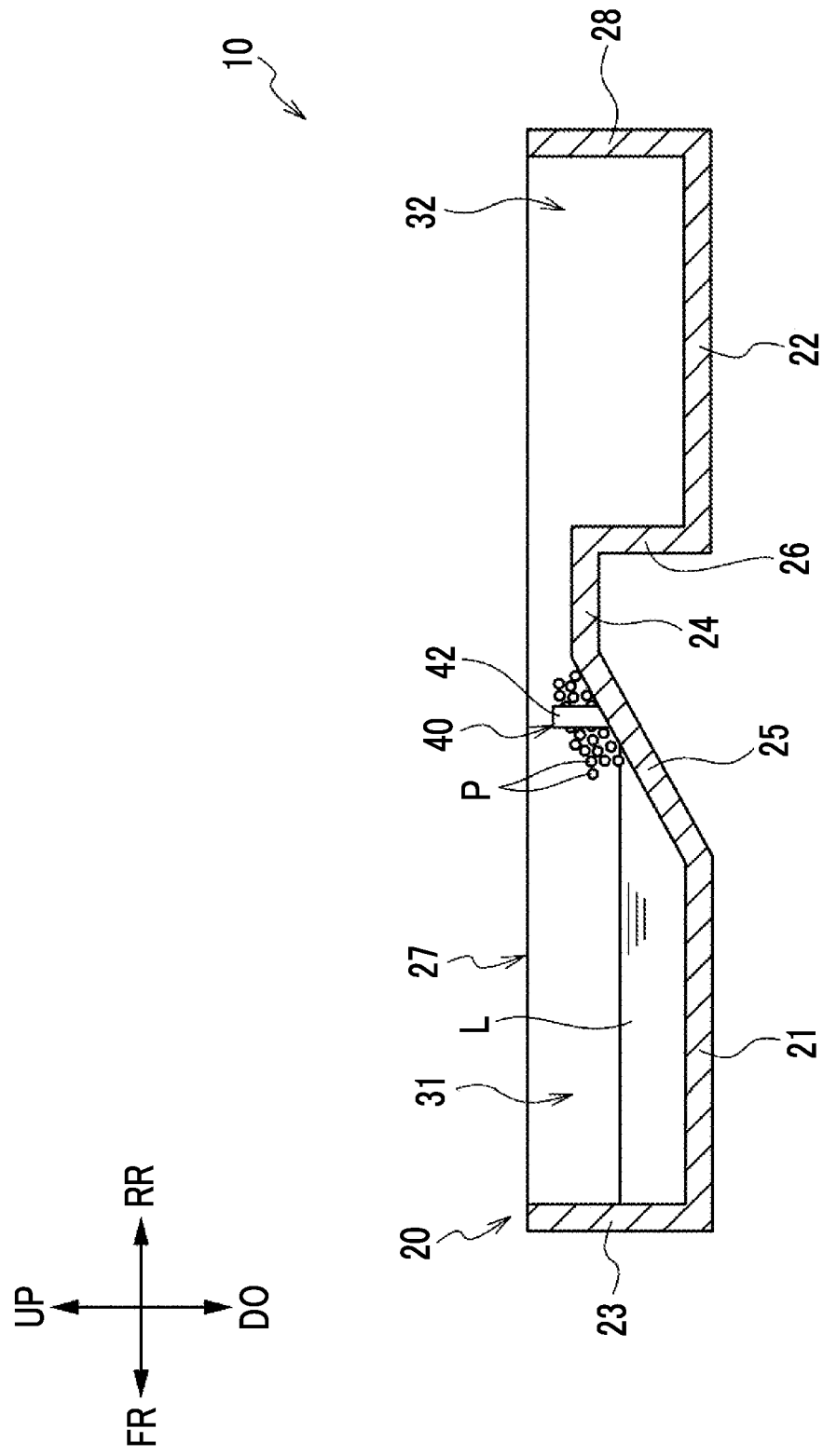
FIG. 5 is a cross-sectional view showing a state where magnetic particles pass through a filter on an inclined wall in the container shown in FIG. 2.

The separation device 10 shown in FIG. 1 is a device that separates magnetic particles P from liquid L containing the magnetic particles P (see FIG. 5). Specifically, as shown in FIG. 2, the separation device 10 includes a container 20, a filter 40, a coil 60, a power source 70, a detection sensor 80 (see FIG. 7), and a control unit 74. The liquid L and the magnetic particles P and the specific configuration of the respective units (the container 20, the filter 40, the coil 60, the power source 70, the detection sensor 80, and the control unit 74) of the separation device 10 will be described below.

Liquid L and Magnetic Particles P

For example, liquid containing an adsorbate, which shows an adsorption action on the magnetic particles P, is used as the liquid L. Specifically, for example, sample liquid containing a sample as an adsorbate is used as the liquid L. More specifically, for example, sample liquid containing deoxyribonucleic acid (DNA), which is isolated from cells, as a sample is used as the liquid L.

The magnetic particles P are particles that are to be attracted by a magnetic force. Specifically, Magnosphere MX100/Carboxyl (model No.) manufactured by JSR Corporation, Magnosphere MS160/Tosyl (model No.) manufactured by JSR Corporation, and the like can be used as the magnetic particles P.

Further, magnetic particles having a particle size in the range of 0.01 μm to 10 μm are used as the magnetic particles P. Preferably, magnetic particles having a particle size of about 1 μm are used as the magnetic particles P.

The liquid L may contain a surfactant that suppresses the aggregation of the magnetic particles P. For example, sodium dodecyl sulfate, polyoxyethylene sorbitan monolaurate (Tween20), TritonX-100, and the like can be used as the surfactant that suppresses the aggregation of the magnetic particles P. These surfactants may be used alone or a mixture of a plurality of surfactants among them may be used.

Container 20

Figure 3:
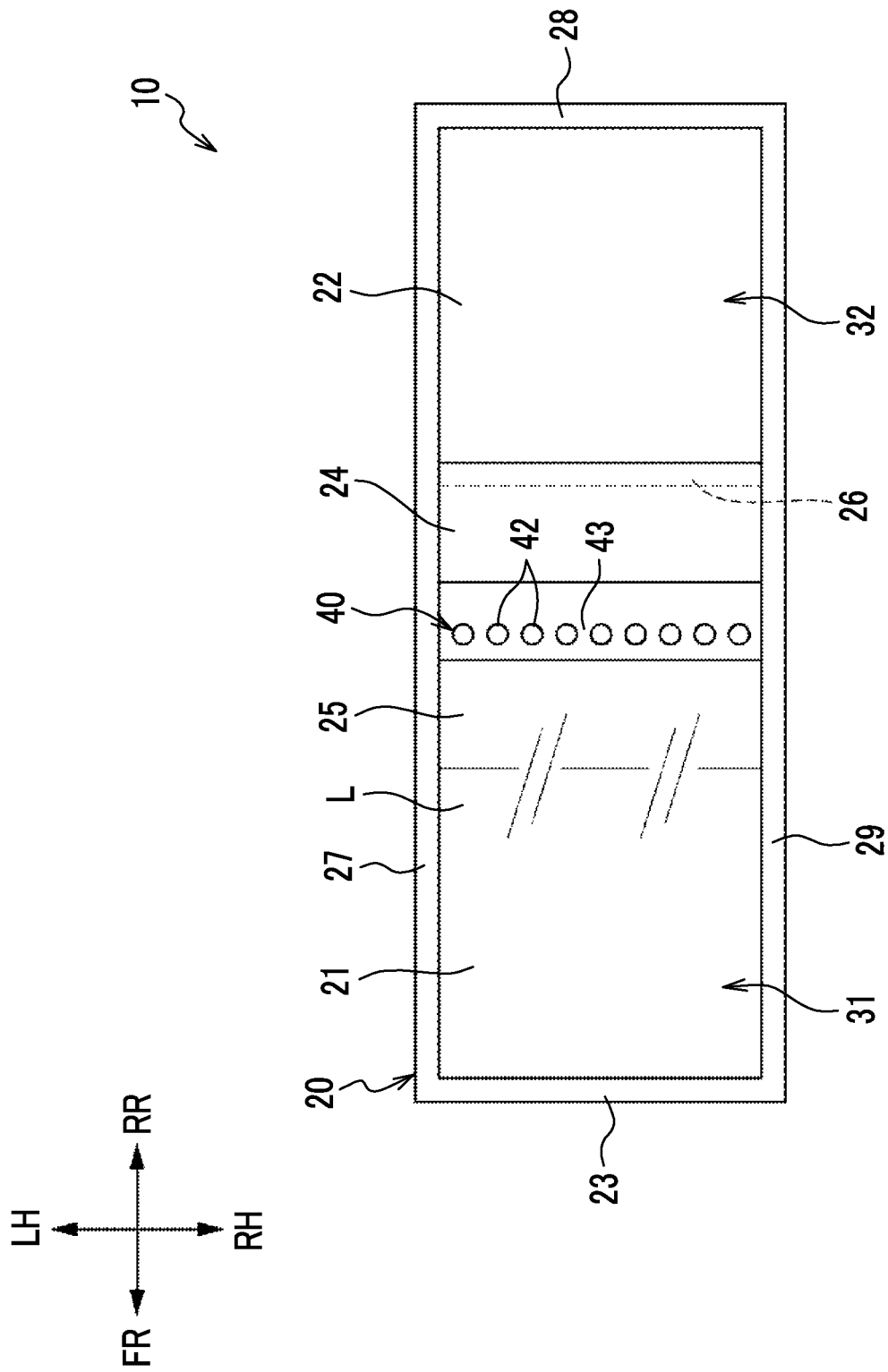
FIG. 3 is a plan view showing the schematic configuration of a container according to this embodiment.
Figure 4:
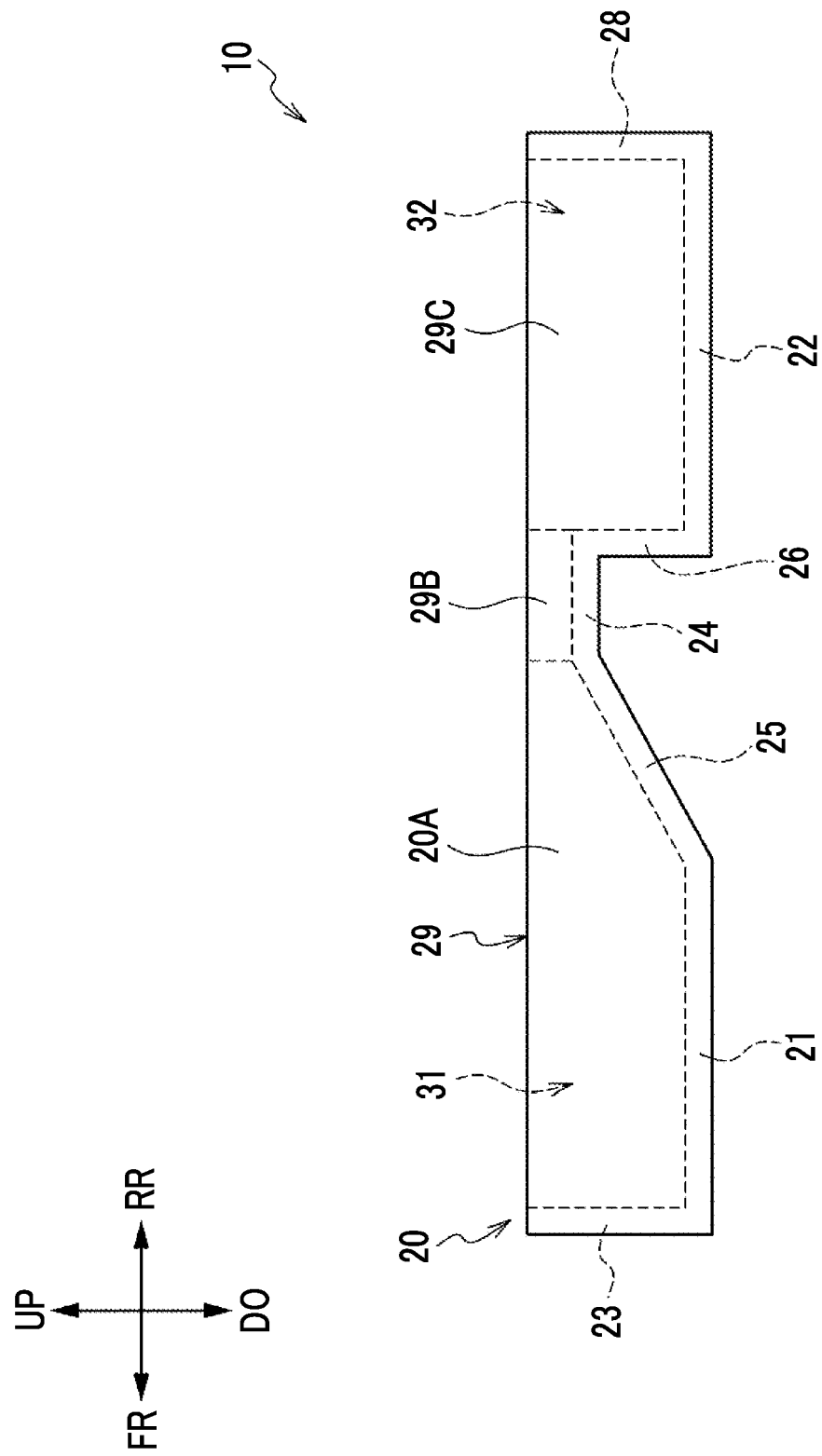
FIG. 4 is a side view showing the schematic configuration of the container according to this embodiment.

FIG. 3 is a plan view showing the schematic configuration of the container 20. FIG. 4 is a side view showing the schematic configuration of the container 20.

The container 20 shown in FIGS. 1, 2, 3, and 4 is a container that stores the liquid L containing the magnetic particles P (see FIG. 5). Specifically, as shown in FIGS. 1 and 3, the container 20 includes a first bottom wall 21, a front wall 23, an inclined wall 25 (an example of a slope), a second bottom wall 22, a horizontal wall 24, a vertical wall 26, a rear wall 28, a left wall 27, a right wall 29, a storage portion 31, and a particle storage portion 32. The first bottom wall 21, the front wall 23, the inclined wall 25, the second bottom wall 22, the horizontal wall 24, the vertical wall 26, the rear wall 28, the left wall 27, and the right wall 29 are formed integrally.

As shown in FIG. 2, the first bottom wall 21 forms the bottom of a front portion (a portion close to the front side) of the container 20. The first bottom wall 21 is formed in the shape of a plate of which the thickness direction corresponds to a vertical direction.

The front wall 23 stands up from the front end of the first bottom wall 21. The front wall 23 is formed in the shape of a plate of which the thickness direction corresponds to a front-rear direction.

The inclined wall 25 is an example of a slope that has an upward inclination from the storage portion. Specifically, the inclined wall 25 extends upward toward the rear side from the rear end of the first bottom wall 21. That is, the inclined wall 25 has an upward inclination toward the rear side. The inclined wall 25 is formed in the shape of a plate of which the thickness direction corresponds to a direction A of FIG. 2.

The inclined wall 25 has liquid repellency for repelling the liquid L. Specifically, for example, a coating agent, such as OPTOOL manufactured by Daikin Industries, Ltd., is applied to the inclined wall 25 so that the inclined wall 25 has liquid repellency.

The horizontal wall 24 extends rearward from the rear end of the inclined wall 25. Specifically, the horizontal wall 24 extends horizontally. The horizontal wall 24 is formed in the shape of a plate of which the thickness direction corresponds to the vertical direction. The horizontal wall 24 may have an upward inclination toward the rear side that is smaller than that of the inclined wall 25. Alternatively, the horizontal wall 24 may have a downward inclination toward the rear side.

The vertical wall 26 extends downward from the rear end of the horizontal wall 24. The vertical wall 26 is formed in the shape of a plate of which the thickness direction corresponds to the front-rear direction.

The second bottom wall 22 extends rearward from the lower end of the vertical wall 26. The second bottom wall 22 forms the bottom of a rear portion (a portion close to the rear side) of the container 20. The second bottom wall 22 is formed in the shape of a plate of which the thickness direction corresponds to the vertical direction.

The rear wall 28 stands up from the rear end of the second bottom wall 22. The rear wall 28 is formed in the shape of a plate of which the thickness direction corresponds to the front-rear direction.

As shown in FIG. 3, the left wall 27 is provided to extend to the left end of the rear wall 28 from the left end of the front wall 23 in the front-rear direction. As shown in FIG. 2, the left wall 27 includes a front portion 27A, an intermediate portion 27B, and a rear portion 27C. The front portion 27A stands up from the left end of the first bottom wall 21 and the left end of the inclined wall 25. The front end portion of the front portion 27A is connected to the left end of the front wall 23. The intermediate portion 27B is an intermediate portion between the front portion 27A and the rear portion 27C, and stands up from the left end of the horizontal wall 24.

The rear portion 27C stands up from the left end of the second bottom wall 22. The lower end portion of the front end portion of the rear portion 27C is connected to the left end of the vertical wall 26. The rear end portion of the rear portion 27C is connected to the left end of the rear wall 28.

As shown in FIG. 3, the right wall 29 is provided to extend to the right end of the rear wall 28 from the right end of the front wall 23 in the front-rear direction. As shown in FIG. 4, the right wall 29 includes a front portion 29A, an intermediate portion 29B, and a rear portion 29C. The front portion 29A stands up from the right end of the first bottom wall 21 and the right end of the inclined wall 25. The front end portion of the front portion 29A is connected to the right end of the front wall 23. The intermediate portion 29B is an intermediate portion between the front portion 29A and the rear portion 29C, and stands up from the right end of the horizontal wall 24.

The rear portion 29C stands up from the right end of the second bottom wall 22. The lower end portion of the front end portion of the rear portion 29C is connected to the right end of the vertical wall 26. The rear end portion of the rear portion 29C is connected to the right end of the rear wall 28.

The container 20 may be adapted so that the horizontal wall 24 and the intermediate portions 27B and 29B are not provided, the front ends of the rear portions 27C and 29C are connected to the rear end portions of the front portions 27A and 29A, and the upper end of the vertical wall 26 is connected to the upper end of the inclined wall 25.

The storage portion 31 is an example of a storage portion that stores liquid containing magnetic particles. The storage portion 31 is formed of a storage space that stores the liquid L containing the magnetic particles P (see FIG. 5). Specifically, the storage portion 31 is formed of a storage space that is provided at the front portion of the container 20. More specifically, the storage portion 31 is formed of a storage space that is surrounded by the first bottom wall 21, the front wall 23, the inclined wall 25, the front portion 27A of the left wall 27, and the front portion 29A of the right wall 29.

The particle storage portion 32 is an example of a particle storage portion that stores magnetic particles separated from liquid. The particle storage portion 32 is formed of a storage space that stores the magnetic particles P separated from the liquid L (see FIG. 6). Specifically, the particle storage portion 32 is formed of a storage space that is provided at the rear portion of the container 20. More specifically, the particle storage portion 32 is formed of a storage space that is surrounded by the second bottom wall 22, the vertical wall 26, the rear wall 28, the rear portion 27C of the left wall 27, and the rear portion 29C of the right wall 29. Accordingly, the particle storage portion 32 is provided on the rear side of the storage portion 31.

Filter 40

The filter 40 is an example of a filter that includes openings through which magnetic particles moved by a magnetic force can pass. The filter 40 is provided on the movement path of the magnetic particles P up to the particle storage portion 32 from the storage portion 31. Specifically, the filter 40 is provided on the inclined wall 25.

Further, the filter 40 is formed in the shape of a comb. Specifically, the filter 40 is formed of a plurality of pins 42 (rod-like members) that stand up from the inclined wall 25. As shown in FIG. 3, the plurality of pins 42 are arranged in a left-right direction in a state where the plurality of pins 42 have gaps 43 through which the magnetic particles P can pass. The gaps 43 function as the openings through which the magnetic particles P moved by a magnetic force can pass.

Coil 60 and Power Source 70

The coil 60 shown in FIG. 2 is an example of a coil that separates magnetic particles from liquid by generating a magnetic field through the application of current, causing a magnetic force to act on the magnetic particles in a state where the coil 60 stops with respect to the storage portion, and causing the magnetic particles to move from the storage portion against gravity acting on the liquid containing the magnetic particles.

"A state where the coil 60 stops with respect to the storage portion" means a state where the coil 60 does not move relative to the storage portion. Accordingly, not only a state where the coil 60 moves but also a state where the storage portion moves in a state where the coil 60 stops does not correspond to "a state where the coil 60 stops with respect to the storage portion".

The coil 60 covers the periphery of the container 20 from the storage portion 31 to the particle storage portion 32 around an axis extending in the front-rear direction. Specifically, the coil 60 covers the periphery of the inclined wall 25, the horizontal wall 24, the vertical wall 26, the second bottom wall 22, the left wall 27, and the right wall 29 around an axis extending in the front-rear direction.

The coil 60 is connected to the power source 70. In a case where current flows from the power source 70 and is applied to the coil 60, the coil 60 generates a magnetic field. The direction of this magnetic field is the direction of an arrow B of FIG. 2 in the coil 60. Further, the coil 60 is disposed so that a middle portion 60A in an axial direction (front-rear direction) at which the magnetic force is maximum is positioned at a front portion of the particle storage portion 32.

The coil 60 is positioned relative to the container 20. In other words, the coil 60 is adapted not to move relative to the container 20. Accordingly, the coil 60 causes a magnetic force to act on the magnetic particles P in a state where the coil 60 stops with respect to the storage portion 31. Then, the coil 60 separates the magnetic particles P from the liquid L by causing the magnetic particles P to move obliquely upward along the inclined wall 25 against gravity acting on the liquid L containing the magnetic particles P.

Figure 6:
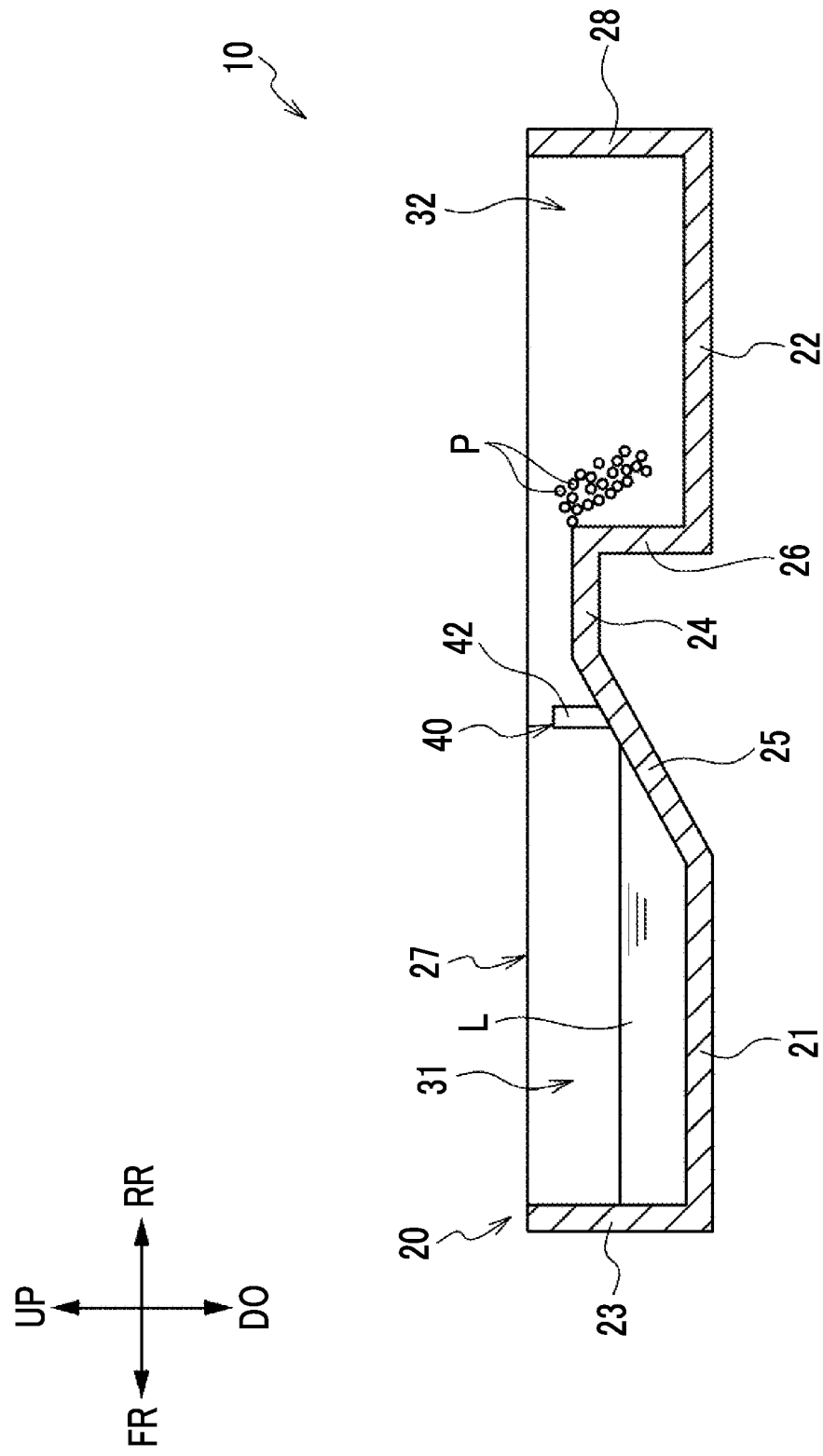
FIG. 6 is a cross-sectional view showing a state where magnetic particles fall to a second bottom wall from a horizontal wall in the container shown in FIG. 2.

Specifically, the magnetic particles P stored in the storage portion 31 are moved by the magnetic force of the coil 60 as described below. That is, the magnetic particles P stored in the storage portion 31 are moved obliquely upward along the inclined wall 25 by the magnetic force of the coil 60, and pass through the filter 40 provided on the inclined wall 25 as shown in FIG. 5. In addition, the magnetic particles P having passed through the filter 40 are moved along the horizontal wall 24 and fall to the second bottom wall 22 from the horizontal wall 24 as shown in FIG. 6. Accordingly, the magnetic particles P are stored in the particle storage portion 32.

The structure of the coil 60 is simplified in FIGS. 1 and 2. However, since the coil 60 is actually disposed to be dense in the front-rear direction, the number of turns of the coil 60 is also larger than the number of turns of the coil shown in FIGS. 1 and 2.

Detection Sensor 80 and Control Unit 74

Figure 7:
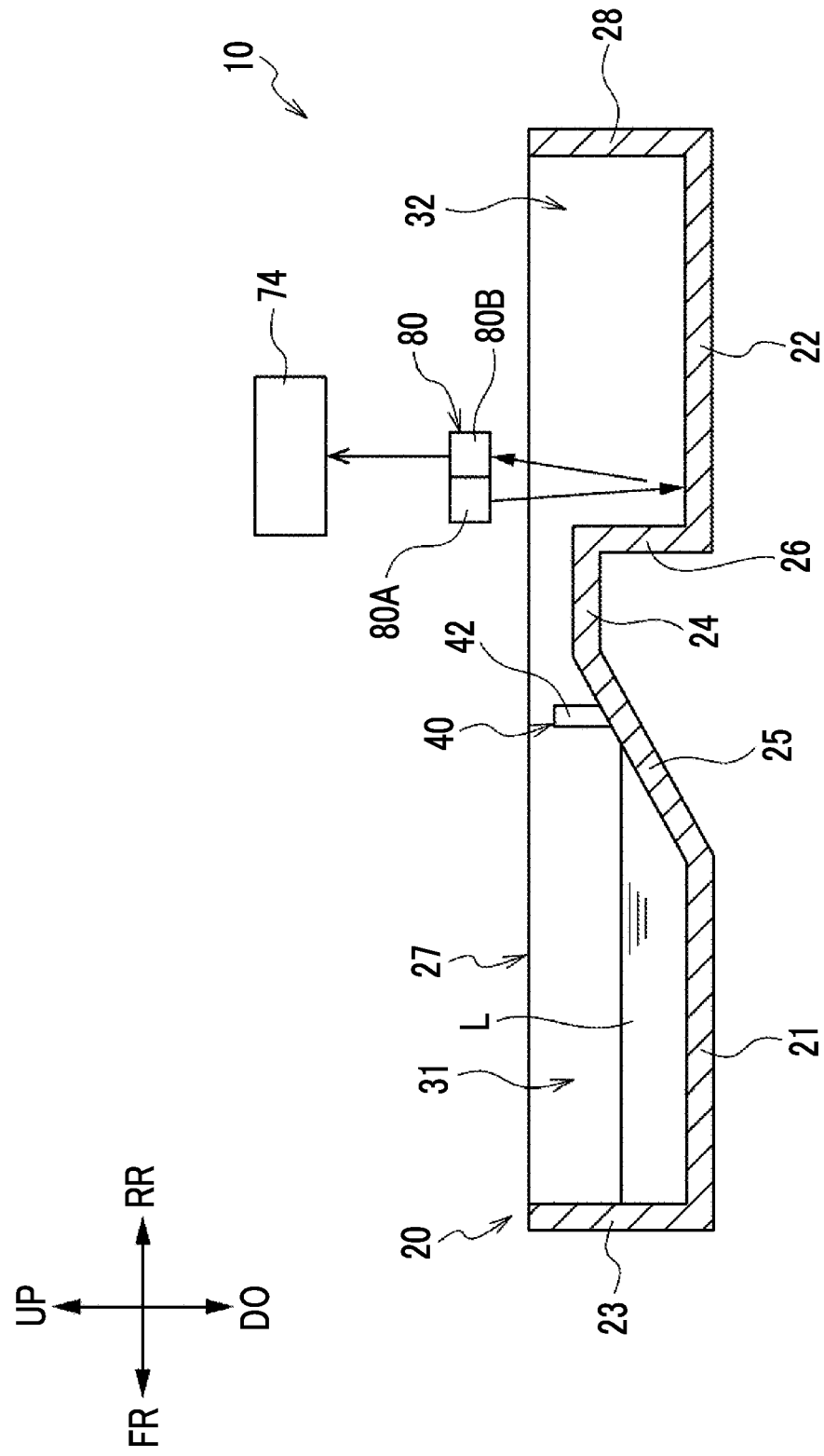
FIG. 7 is a cross-sectional view showing a detection sensor that is provided above the container shown in FIG. 2.

The detection sensor 80 shown in FIG. 7 is an example of a sensor detecting that magnetic particles are stored in the particle storage portion. For example, a non-contact sensor detecting that the magnetic particles P are stored in the particle storage portion 32 without being in contact with the container 20 is used as the detection sensor 80. Specifically, for example, an optical sensor, which is a non-contact sensor and uses light, is used as the detection sensor 80.

More specifically, for example, a reflective optical sensor including a light-emitting part 80A and a light-receiving part 80B is used as the detection sensor 80. In a case where a reflective optical sensor is used, the detection sensor 80 detects that the magnetic particles P are stored in the particle storage portion 32 by, for example, a difference between the amount of light reflected by the second bottom wall 22 in a state where the magnetic particles P are not stored in the particle storage portion 32 and the amount of light reflected by the magnetic particles P stored in the particle storage portion 32.

For example, the detection sensor 80 is disposed above the particle storage portion 32. Specifically, the detection sensor 80 is disposed, for example, at a front portion of the particle storage portion 32, that is, near the vertical wall 26.

The detection result of the detection sensor 80 is output to the control unit 74 that controls ON/OFF of the power source 70. Then, in a case where the control unit 74 acquires the detection result showing that the magnetic particles P are stored in the particle storage portion 32, the control unit 74 turns off the power source 70. That is, in a case where the detection sensor 80 detects that the magnetic particles P are stored in the particle storage portion 32, the coil 60 stops generating a magnetic field.

An optical sensor other than a reflective optical sensor, for example, a transmissive optical sensor may be used as the detection sensor 80. Alternatively, a non-contact sensor that detects an object using static electricity may be used as the detection sensor 80, and any sensor may be used as long as the sensor can detect that the magnetic particles P are stored in the particle storage portion 32.

The control unit 74 may control the power source 70 so that the coil 60 separates the magnetic particles P from the liquid L by increasing or reducing a magnetic force acting on the magnetic particles P. Specifically, for example, the control unit 74 increases or reduces a magnetic force, which is made to act on the magnetic particles P by the coil 60, by switching ON/OFF of the power source 70 a plurality of times.

The control unit 74 may change the value of current to be applied to the coil 60 to increase or reduce the magnetic force of the coil 60, and a strong state where a magnetic force is increased and a weak state where a magnetic force is smaller than that in the strong state have only to occur. The weak state includes a state where a magnetic force is not generated, that is, a state where the application of current to the coil 60 is stopped.

Separation Method

Next, a separation method of separating the magnetic particles P from the liquid L, which contains the magnetic particles P, using the separation device 10 will be described.

This separation method includes, for example, a preparation step and a separation step. In this separation method, the preparation step and the separation step are performed in this order. Each step of this separation method will be described.

Preparation Step

The preparation step includes a storing step and a disposing step (setting step). In the storing step, the liquid L containing the magnetic particles P is stored in the storage portion 31 of the container 20. In the disposing step, the container 20 where the liquid L is stored in the storage portion 31 is disposed (set) at a position covered with the coil 60 (a position shown in FIGS. 1 and 2).

Separation Step

In the separation step, the power source 70 is turned on. Accordingly, the coil 60 causes a magnetic force to act on the magnetic particles P stored in the storage portion 31 in a state where the coil 60 stops with respect to the storage portion 31. Then, the coil 60 separates the magnetic particles P from the liquid L by causing the magnetic particles P, which are stored in the storage portion 31, to move obliquely upward along the inclined wall 25 against gravity acting on the liquid L containing the magnetic particles P. The magnetic particles P pass through the filter 40 (see FIG. 5) in a case where the magnetic particles P move along the inclined wall 25. The magnetic particles P having passed through the filter 40 move along the horizontal wall 24, and fall to the second bottom wall 22 from the horizontal wall 24 (see FIG. 6). Accordingly, the magnetic particles P are stored in the particle storage portion 32.

In a case where the detection sensor 80 detects that the magnetic particles P having moved from the storage portion 31 are stored in the particle storage portion 32 (see FIG. 7), the power source 70 is turned off and the coil 60 stops generating a magnetic field.

Specific Example of Use of Separation Device 10

The separation device 10 can be used for the processing of a polymerase chain reaction. Specifically, the separation device 10 can be used in, for example, a case where deoxyribonucleic acid (DNA) isolated from cells is made to be adsorbed in magnetic particles and magnetic particles in which DNA is adsorbed are to be separated from a liquid mixture to which DNA is mixed.

Effects of This Embodiment

According to this embodiment, the coil 60 separates the magnetic particles P from the liquid L by causing a magnetic force to act on the magnetic particles P in a state where the coil 60 stops with respect to the storage portion 31 and causing the magnetic particles P to move against gravity acting on the liquid L containing the magnetic particles P. Accordingly, a moving mechanism or a drive unit for moving the coil 60 relative to the storage portion 31 is not required.

For this reason, the magnetic particles P can be separated from the liquid L with a simple structure in comparison with a case where the coil 60 is moved relative to the storage portion 31 to separate the magnetic particles P from the liquid L.

Further, in this embodiment, the magnetic particles P separated from the liquid L are stored in the particle storage portion 32. Here, in a case where the magnetic particles P are to be separated from the liquid L in configuration where only storage portion 31 is provided without the particle storage portion 32, for example, an operation for removing the liquid L from the storage portion 31, or the like in a state where the magnetic particles P are held in the storage portion 31 by a magnetic force or the like is required. In contrast, since the magnetic particles P separated from the liquid L are stored in the particle storage portion 32 in this embodiment as described above, an operation for removing the liquid L from the storage portion 31, or the like in a state where the magnetic particles P are held in the storage portion 31 by a magnetic force or the like is not required.

Furthermore, since the magnetic particles P are moved obliquely upward along the inclined wall 25 to be separated from the liquid L in this embodiment, the ease of movement of the magnetic particles P moved by the magnetic force of the coil 60 can be adjusted depending on the magnitude of the upward inclination of the inclined wall 25.

Moreover, since the inclined wall 25 has liquid repellency in this embodiment, the liquid L smoothly flows down along the inclined wall 25. For this reason, the magnetic particles P and the liquid L can be efficiently separated from each other.

Further, in this embodiment, the magnetic particles P pass through the filter 40 in a case where the magnetic particles P move along the inclined wall 25. Accordingly, the magnetic particles P and foreign matters can be separated from each other by the filter 40.

Furthermore, since the coil 60 covers the periphery of the inclined wall 25 in this embodiment, the magnetic force of the coil 60 is made to efficiently act on the magnetic particles P, so that the magnetic particles P can be moved obliquely upward along the inclined wall 25.

In addition, since the coil 60 covers the periphery of the particle storage portion 32 in this embodiment, the magnetic force of the coil 60 is made to efficiently act on the magnetic particles P, so that the magnetic particles P can be moved to the particle storage portion 32.

Further, the detection sensor 80 is provided in this embodiment. Accordingly, in a case where the detection sensor 80 detects that the magnetic particles P stored in the particle storage portion 32, the coil 60 stops generating a magnetic field. For this reason, it is possible to prevent the coil 60 from stopping generating a magnetic field before the magnetic particles P are stored in the particle storage portion 32.

Furthermore, in a case where the coil 60 separates the magnetic particles P by increasing or reducing a magnetic force acting on the magnetic particles P, the magnetic particles P can be separated from the liquid L after the magnetic particles P caught on the movement path are made to retreat toward the storage portion 31 by gravity.

Modification Examples

The filter 40 is provided on the inclined wall 25 in this embodiment, but is not limited thereto. The filter 40 may be provided on, for example, the horizontal wall 24 or has only to be provided on the movement path of the magnetic particles P from the storage portion 31 to the particle storage portion 32. Further, the filter 40 may be disposed in the storage portion 31 at a position that is in contact with the liquid L or a position that is submerged in the liquid L. In addition, configuration in which the filter 40 is not provided may be provided.

Further, the filter 40 is formed in the shape of a comb in this embodiment, but is not limited thereto. For example, the filter 40 may be a filter in which a plurality of holes are formed, or has only to be a filter including openings through which the magnetic particles P moved by a magnetic force can pass.

Figure 8:
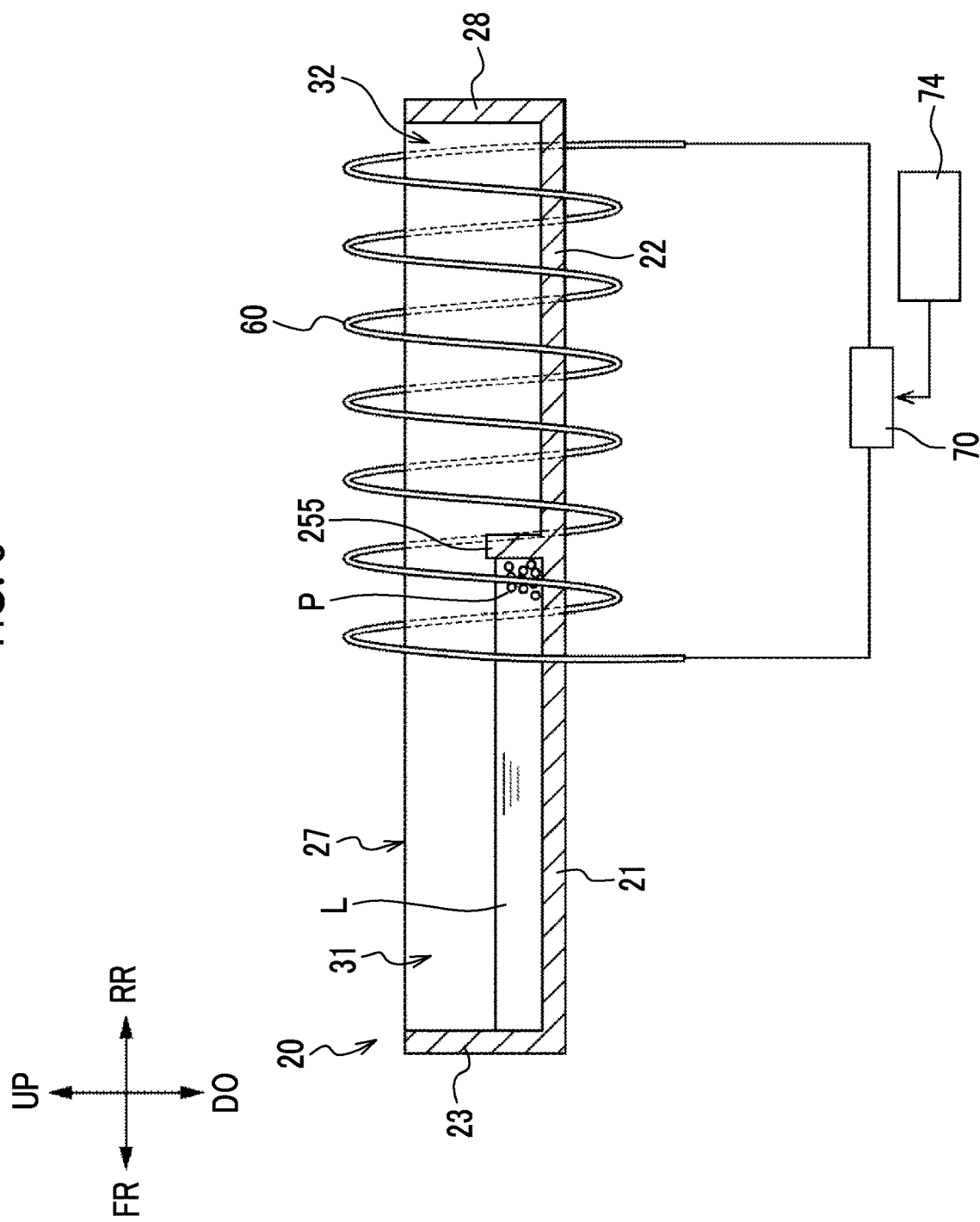
FIG. 8 is a cross-sectional view showing the schematic configuration of a container according to a modification example.

The inclined wall 25 is provided in this embodiment, but configuration not including the inclined wall 25 may be provided. For example, configuration shown in FIG. 8 can be considered as this configuration. In the configuration shown in FIG. 8, the container 20 does not include the inclined wall 25, the horizontal wall 24, and the vertical wall 26 and includes a partition wall 255. The storage portion 31 and the particle storage portion 32 are partitioned by the partition wall 255. The partition wall 255 stands up between the first bottom wall 21 and the second bottom wall 22. Further, in the configuration shown in FIG. 8, a magnetic force is made to act on the magnetic particles P stored in the storage portion 31 so that the magnetic particles P go over the partition wall 255. Accordingly, the magnetic particles P are moved to the particle storage portion 32 from the storage portion 31.

The coil 60 covers the periphery of the inclined wall 25, the horizontal wall 24, the vertical wall 26, and the second bottom wall 22 around an axis extending in the front-rear direction in this embodiment, but is not limited thereto. For example, the coil 60 may not cover the periphery of the inclined wall 25, the horizontal wall 24, and the vertical wall 26. Further, the coil 60 may cover the periphery of the entire container 20. That is, the coil 60 may cover any portion of the container 20 as long as the magnetic particles P can be moved from the storage portion 31.

The container 20 includes the particle storage portion 32 in this embodiment, but is not limited thereto. For example, the separation device 10 may include a particle storage portion formed of a member separate from the container 20.

The invention is not limited to the above-mentioned embodiment and may have various modifications, alterations, or improvements without departing from the scope of the invention. For example, a plurality of modification examples among the above-mentioned modification examples may be appropriately combined.

All documents, patent applications, and technical standards disclosed in this specification are incorporated in this specification by reference so that the incorporation of each of the documents, the patent applications, and the technical standards by reference is specific and is as detailed as each of the documents, the patent applications, and the technical standards.

A separation device according to a first aspect comprises: a storage portion that stores liquid containing magnetic particles; and a coil that separates the magnetic particles from the liquid by generating a magnetic field through application of current, causing a magnetic force to act on the magnetic particles in a state where the coil stops with respect to the storage portion, and causing the magnetic particles to move from the storage portion against gravity acting on the liquid containing the magnetic particles.

According to the separation device of the first aspect, the coil separates the magnetic particles from the liquid by causing a magnetic force to act on the magnetic particles in a state where the coil stops with respect to the storage portion and causing the magnetic particles to move against gravity acting on the liquid containing the magnetic particles. Accordingly, a moving mechanism or a drive unit for moving the coil relative to the storage portion is not required.

For this reason, the magnetic particles can be separated from the liquid with a simple structure in comparison with configuration where a coil is moved relative to a storage portion to separate magnetic particles from liquid.

According to a second aspect, the separation device may further comprise a filter that includes openings through which magnetic particles moved by the magnetic force are capable of passing.

According to the separation device of the second aspect, the magnetic particles and foreign matters can be separated from each other by the filter.

According to a third aspect, the separation device may further comprise an inclined portion that has an upward inclination from the storage portion, and the coil may separate the magnetic particles from the liquid by causing the magnetic particles to move obliquely upward along the inclined portion.

According to the separation device of the third aspect, the ease of movement of the magnetic particles moved by the magnetic force of the coil can be adjusted depending on the magnitude of the upward inclination of the inclined portion.

According to a fourth aspect, in the separation device, the inclined portion may have liquid repellency for repelling the liquid.

According to the separation device of the fourth aspect, since the inclined portion has liquid repellency, the liquid smoothly flows down along the inclined portion. For this reason, the magnetic particles and the liquid can be efficiently separated from each other.

According to a fifth aspect, in the separation device, the coil may cover a periphery of the inclined portion.

According to the separation device of the fifth aspect, the magnetic force is made to efficiently act on the magnetic particles, so that the magnetic particles can be moved obliquely upward along the inclined portion.

According to a sixth aspect, the separation device may further comprise a particle storage portion that stores the magnetic particles separated from the liquid.

Here, in a case where the magnetic particles are to be separated from the liquid in configuration where only a single storage portion is provided without the particle storage portion, for example, an operation for removing the liquid from the storage portion, or the like in a state where the magnetic particles are held in the storage portion by a magnetic force or the like is required. In contrast, according to the separation device of the sixth aspect, an operation for removing the liquid from the storage portion, or the like in a state where the magnetic particles are held in the storage portion by a magnetic force or the like is not required.

According to a seventh aspect, in the separation device, the coil may cover a periphery of the particle storage portion.

According to the separation device of the seventh aspect, the magnetic force is made to efficiently act on the magnetic particles, so that the magnetic particles can be moved to the particle storage portion.

According to an eighth aspect, the separation device may further comprise a detection unit detecting that the magnetic particles are stored in the particle storage portion, and the coil may stop generating a magnetic field in a case where the detection unit detects that the magnetic particles are stored in the particle storage portion.

According to the separation device of the eighth aspect, it is possible to prevent the coil from stopping generating a magnetic field before the magnetic particles are stored in the particle storage portion.

According to a ninth aspect, in the separation device, the coil may separate the magnetic particles from the liquid by increasing or reducing the magnetic force acting on the magnetic particles.

According to the separation device of the ninth aspect, since the coil separates the magnetic particles by increasing or reducing a magnetic force acting on the magnetic particles, the magnetic particles can be separated from the liquid after the magnetic particles caught on the movement path are made to retreat toward the storage portion by gravity.

A separation method according to a tenth aspect separates magnetic particles from liquid by causing a magnetic force, which is generated through application of current by a coil, to act on the magnetic particles in a state where the coil stops with respect to a storage portion for storing the liquid containing the magnetic particles and causing the magnetic particles to move from the storage portion against gravity acting on the liquid containing the magnetic particles.

According to the separation method of the tenth aspect, the coil separates the magnetic particles from the liquid by causing a magnetic force to act on the magnetic particles in a state where the coil stops with respect to the storage portion and causing the magnetic particles to move against gravity acting on the liquid containing the magnetic particles. Accordingly, a moving mechanism or a drive unit for moving the coil relative to the storage portion is not required.

For this reason, the magnetic particles can be separated from the liquid with a simple structure in comparison with a separation method of separating magnetic particles from liquid by moving a coil relative to a storage portion.

According to the technique of the disclosure, magnetic particles can be separated from liquid with a simple structure.

What is claimed is:

1. A separation device comprising:
  a container that includes a storage portion for storing liquid containing magnetic particles;
  a coil that separates the magnetic particles from the liquid by generating a magnetic field through application of current; causing a magnetic force to act on the magnetic particles in a state where the coil does not move relative to the storage portion, and causing the magnetic particles to move from the storage portion against gravity acting on the liquid containing the magnetic particles; and
  a slope that has an upward inclination from the storage portion,
  wherein the coil surrounds a periphery of the slope from an outer side and separates the magnetic particles from the liquid by causing the magnetic particles to move obliquely upward along the slope.

2. The separation device according to claim 1; further comprising:
  a filter that includes openings through which magnetic particles that have been moved from the storage portion by the magnetic force are capable of passing.

3. The separation device according to claim 2,
  wherein the slope has liquid repellency for repelling the liquid.

4. The separation device according to claim 2,
  wherein the coil separates the magnetic particles from the liquid by increasing or reducing the magnetic force acting on the magnetic particles.

5. The separation device according to claim 1,
  wherein the slope has liquid repellency for repelling the liquid.

6. The separation device according to claim 1,
  wherein the container includes a particle storage portion that stores the magnetic particles separated from the liquid.

7. The separation device according to claim 6,
  wherein the coil covers a periphery of the particle storage portion.

8. The separation device according to claim 7, further comprising:
  a sensor detecting that the magnetic particles are stored in the particle storage portion,
  wherein the coil stops generating a magnetic field in a case where the sensor detects that the magnetic particles are stored in the particle storage portion.

9. The separation device according to claim 6, further comprising:
  a sensor detecting that the magnetic particles are stored in the particle storage portion,
  wherein the coil stops generating a magnetic field in a case where the sensor detects that the magnetic particles are stored in the particle storage portion.

10. The separation device according to claim 1,
  wherein the coil separates the magnetic particles from the liquid by increasing or reducing the magnetic force acting on the magnetic particles.

11. A separation device comprising:
  a container that includes a storage portion for storing liquid containing magnetic particles; and
  a coil that separates the magnetic particles from the liquid by generating a magnetic field through application of current, causing a magnetic force to act on the magnetic particles in a state where the coil does not move relative to the storage portion, and causing the magnetic particles to move from the storage portion against gravity acting on the liquid containing the magnetic particles,
  wherein the container includes a particle storage portion that stores the magnetic particles separated from the liquid, and
  wherein the coil surrounds a periphery particle storage portion from an outer side.

* * * * *